United States Patent [19]

Ishizuka

[11] 4,128,625
[45] Dec. 5, 1978

[54] PROCESS FOR SYNTHESIZING DIAMONDS

[76] Inventor: Hiroshi Ishizuka, 19-2 Ebara 6-chome, Shinagawa-ku Tokyo, Japan

[21] Appl. No.: 841,715

[22] Filed: Oct. 13, 1977

[30] Foreign Application Priority Data

Oct. 18, 1976 [JP] Japan ............................... 51-125212

[51] Int. Cl.² ........................................... C01B 31/06
[52] U.S. Cl. .................................................. 423/446
[58] Field of Search ......................................... 423/446

[56] References Cited

U.S. PATENT DOCUMENTS

| 2,947,609 | 8/1960 | Strong | 423/446 |
| 3,031,269 | 4/1962 | Bovenkerk | 423/446 |
| 3,124,422 | 3/1964 | Custers et al. | 423/446 |
| 4,034,066 | 7/1977 | Strong et al. | 423/446 |
| 4,042,673 | 8/1977 | Strong | 423/446 |

FOREIGN PATENT DOCUMENTS 47-4605  8/1972  Japan ...................................... 423/446

Primary Examiner—Edward J. Meros
Attorney, Agent, or Firm—Eyre, Mann, Lucas & Just

[57] ABSTRACT

A process for synthesizing larger size diamonds wherein a raw material carbon substance and a solvent-catalyst metal initially isolated from the carbon substance by a metal having no affinity to carbon are subjected to high pressure-high temperature conditions within a diamond-stable region calculated and defined by a specific combination of the carbon substance and solvent-catalyst metal to temporarily restrict nucleation at the reaction earlier stage to control the number of diamond crystal nucleuses.

4 Claims, No Drawings

PROCESS FOR SYNTHESIZING DIAMONDS

The present invention relates to a process for synthesizing diamonds with use of the so-called indirect or catalytic method wherein a raw material carbon substance, such as graphite and a solvent-catalyst metal, for instance nickel, cobalt or the like metal belonging to Group VIII of the periodic table or an alloy thereof are subjected to and held at high pressure-high temperature conditions within a diamond-stable region calculated and defined by a specific combination of the carbon substance and solvent-catalyst metal to convert the material carbon to diamond, and more particularly to an improvement in such process to synthesize larger size diamonds suitable as the material for manufacturing diamond tools, especially diamond saws.

The reaction mechanism in the catalytic method has been explained as that the material carbon is diffused into the solvent-catalyst metal under the high pressure-high temperature conditions to saturate the metal therewith and crystalized from the metal matrix as diamond [see, for instance, "The Journal of Chemical Physics" Vol. 35, No. 2, pages 383–391 (August 1961)]. The growth of each diamond crystal, of course, begins with the nucleation. When taking into consideration of the technical common sense in the crystallography that once formed crystal grows-up with an energy lower than that for forming a new crystal nucleus, it is apt to think that larger size diamonds can be synthesized by previously arranging diamond seed crystals in a reaction vessel together with a raw material carbon substance and solvent-catalyst metal. This measure, however, is not satisfactory, since the nucleation proceeds notwithstanding whether the diamond seed crystals are present or not so that a number of undesirably fine and coarse crystals will be formed unless the synthetic operation should be carried out at pressure and temperature conditions well complying with the material carbon-diamond equiblirium line and unless the diamond seed crystal should have an activated surface which is necessary for ensuring desired deposition of diamond converted from the material carbon thereon or in other words desired growth of the diamond seed crystal.

For the growth of diamond crystals to obtain good and larger size diamonds, therefore, it has hitherto been requested to employ a method as disclosed in U.S. Pat. No. 3,031,269 whereby the reaction temperature is precisely controlled depending on synthesizing stages. This method, however, has a disadvantage in that the temperature should be raised from a threshold to a predetermined level quickly in from 1 to 3 seconds under careful control.

The present invention aims to obviate and overcome the disadvantage encountered in the method as disclosed in said U.S. patent from the different view point that synthesis of larger size diamonds can be expected by restricting the formation of diamond nucleuses in the conversion reaction from carbon to diamond with taking the aforesaid technical common sense in the crystallography into consideration.

According to the invention, the aim can be attained by isolating the material carbon from the solvent-catalyst metal in the reaction vessel at the reaction earlier stage with a metal having no affinity to carbon. As a material for such partition, copper, silver, gold or the like, or an alloy thereof may preferably be used but it is not always necessary to use the metal of high grade or purity. It may contain a low amount of bismuth, gallium, germanium, indium, lead, antimony or tin usually found in the concerned metal commercially available.

The process according to the invention may be carried out for instance by inserting a thin copper disk as the separating metal plate between a graphite disk as the material carbon and a cobalt disk as the solvent-catalyst metal in the cylindrical reaction vessel, placing the reaction vessel in a high pressure apparatus to give a pressure required for diamond synthesis and then electrically heating the materials in the reaction vessel directly or indirectly.

The behavior or functions of the separating plate is as follows to control the diamond nucleation and subsequent diamond crystal growth during the diamond synthesis.

1. At the begining stage, the separating disk prevents the contact between the material carbon and the solvent-catalyst metal to inhibit the mutual diffusion therebetween.

2. When internal temperature of the reaction vessel becomes higher than the melting point of the separating disk material in question, the separating disk will gradually be fused. But in this connection, it should be noted that the fusion of the separating disk occurs not uniformly but locally, since there is an unavoidable temperature gradient in the reaction vessel depending on the selected method for heating the reaction vessel. If the vessel is heated with use of the so-called direct method wherein materials in the vessel are heated by electrical resistance thereof, the temperature of the central portion in the vessel becomes higher than the other portion near the inner surface of the vessel and if the vessel is heated with use of the so-called indirect method wherein the materials are heated outside the vessel through an electrical heating element, the temperature of the central portion in the vessel becomes lower than the other portion. Therefore, the contact area between the material carbon and the solvent-catalyst metal is restricted to control formation of diamond nucleuses, whereby larger size diamond crystals can be obtained since the growth of diamond crystal has a preference to a formation of new diamond nucleus. Of course, the area where diamond nucleus is newly formed moves gradually as the separating disk melts but the number of diamond nucleuses to be formed is far less in comparison with a conventional case where the material carbon and the solvent-catalyst metal are filled in contact in the reaction vessel without any separating member.

The invention will now be explained in more detail with reference to an Example.

EXAMPLE

In a hollow cylindrical reaction vessel of agalmatolite having an inner diameter of 15mm and height of 20mm, a graphite disk of 7mm, copper disk or foil of 50μ, cobalt disc plate of 6mm, copper disk of 50μ and graphite disk of 7mm in thickness were arranged in this order to fulfil inner space thereof. The resulting reaction vessel was placed in a high pressure and high temperature apparatus for synthesizing diamonds and subjected to conditions of 53Kb and 1400° C. for 10 minutes to obtain 1.5g of synthetic diamond grains containing those having diameter more than 0.4mm in an amount of larger than 50%, said diamond grains being formed radially at interfaces where said cobalt disk and said graphite disks had been arranged.

A comparative test was carried out under conditions substantially same with those as referred to excepting that no copper disk was arranged in a reaction vessel. In this case, 1.8g of diamond grains were obtained but all of those were of smaller than 0.25mm.

I claim:

1. In the process for synthesizing diamonds by subjecting in a reaction vessel a non-diamond material carbon and a solvent-catalyst metal to a high pressure-high temperature condition in diamond-stable region of carbon phase diagram, the improvement comprising the material carbon being initially isolated from the solvent-catalyst metal by a thin plate of a metal selected from the group consisting of copper, gold, silver and an alloy thereof, said thin metal plate melting partially under said condition to allow initiation of nucleation for diamond formation in a limited area increasing the size of the diamonds obtained.

2. The process of claim 1 wherein the thin metal plate is a foil 50 microns thick.

3. The process of claim 1 wherein the material carbon is graphite.

4. The process of claim 1 wherein the solvent-catalyst metal is sandwiched between two carbon pieces and the thin metal plate is placed between each of the two contiguous locations of the material carbon and solvent-catalyst metal.

* * * * *